July 12, 1949.                I. D. WALLACH                2,476,075
                              ELECTRIC MOTOR
                           Filed April 16, 1946
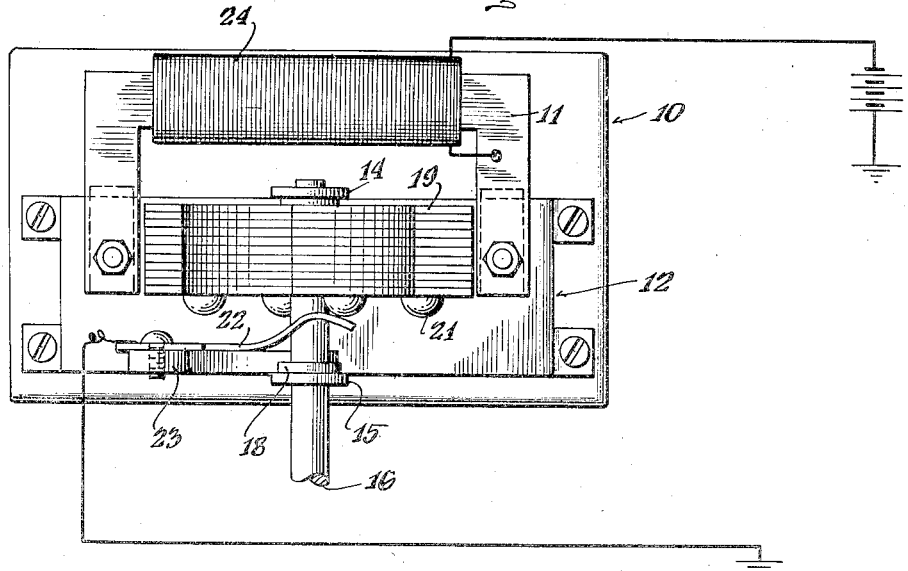
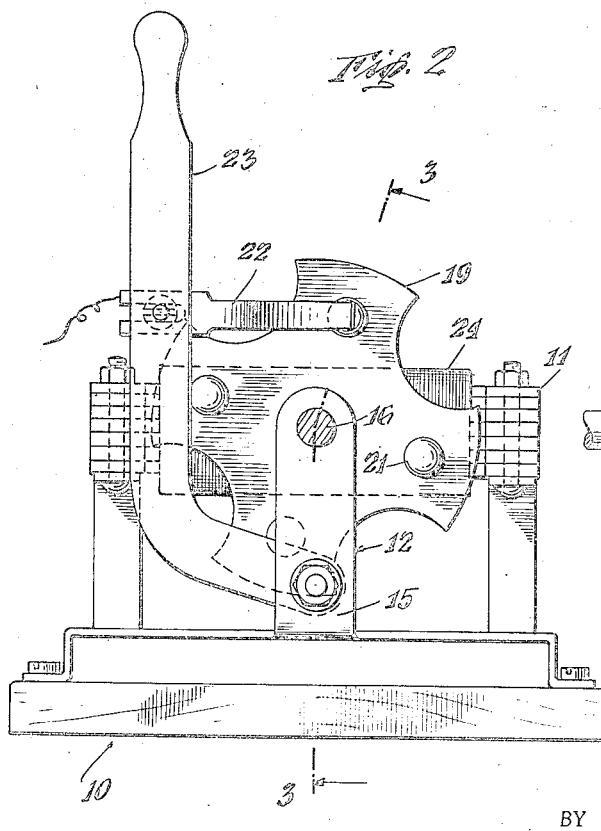
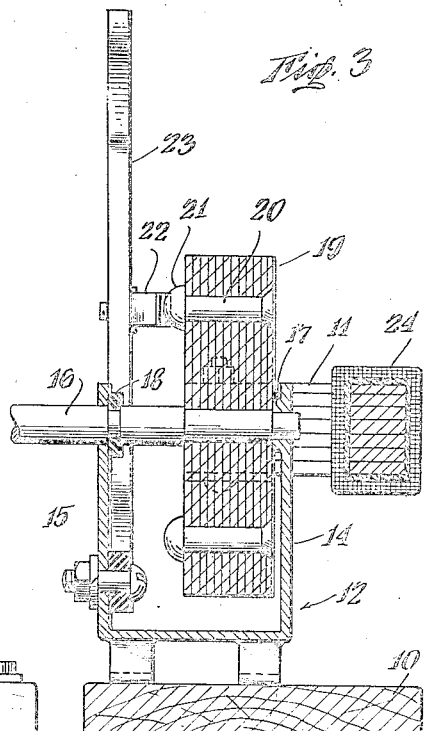
INVENTOR.
Irving D. Wallach
BY Duell, Kane & Smoot
ATTORNEYS Patented July 12, 1949

2,476,075

UNITED STATES PATENT OFFICE 2,476,075

ELECTRIC MOTOR

Irving D. Wallach, Port Washington, N. Y., assignor to Associated Development & Research Corporation, New York, N. Y., a corporation of New York Application April 16, 1946, Serial No. 662,479

2 Claims. (Cl. 172—36)

This invention relates to an electric motor, and particularly to a low cost electric motor of the type used, for example, in driving or propelling mechanical toys.

It is a principal object of the invention to provide a low cost electric motor which can be reversed at will, and without requiring reversing switch means or the rearrangement of the electrical connections.

It is yet another object of the invention to provide an electric motor which is operable on low voltage battery power, and having a brush adjustment pursuant to which the speed of rotation and the direction of rotation can be changed as desired.

It is an object of the invention to provide an electric motor having an electromagnetic field member and an unwound armature rotatably mounted therebetween, said armature acting as a commutator.

It is an object of the invention to provide an electric motor provided with a multiple pole armature, one face of each of the armature poles having an electric contact for cooperation with a spring brush member to energize the field coil.

It is an object of the invention to provide an electric motor having a field coil winding adapted to be periodically energized by contact of a brush member with electric contact means forming an integral part of the armature.

It is another object of the invention to provide an electric motor in which the armature per se is in the field coil energizing circuit, and in which the brush member periodically engaged by the armature completes the field coil circuit.

It is still another object of the invention to provide an electric motor as recited immediately above, in which the time of completion of the field coil circuit is adjustable relative to the angular position of the poles of the armature relative to the field poles.

It is yet another object of the invention to provide an electric motor as aforesaid, which is low in manufacturing cost and easy to assemble by unskilled labor, and which will function over long periods of time without operational difficulties.

In the accompanying drawings:

Fig. 1 is a top plan view of a presently preferred embodiment of a motor embodying the present invention, the wiring circuit being schematically shown;

Fig. 2 is a front elevation of the motor; and

Fig. 3 is an end elevation taken in section on lines 3—3 of Fig. 2.

Referring to the drawings, the motor 10 includes a U-shaped field coil 11 carried upon a frame 12 of non-magnetic material, such as brass. Extending upwardly from the base of the frame are standards 14, 15 having aligned openings to rotatably receive a shaft 16. The standard 14 may have an upset collar 17 to provide a bearing for a reduced-diameter end of said shaft. A snap-ring or equivalent 18 may be positioned on the shaft adjacent the standard 15 to prevent disengagement of the shaft from the collar 17. A suitable base B may support the frame 12. A multipolar armature 19, illustratively having four poles, preferably consists of a plurality of soft iron plates held together by the rivets 20, or equivalent. The said rivets are preferably centrally located with respect to the poles, and thereby disposed equidistantly about a circle concentric with the axis of rotation of the armature. Each rivet has a contact head 21 which lightly engages a light spring-metal brush 22 as the armature rotates. The brush does not at any time contact the principal surface of the armature.

The speed and direction of rotation of the armature is controlled by the relative position of the brush with the axis of rotation of the armature, as later explained. The brush is therefore advantageously supported in a lever 23 frictionally pivotally mounted on the standard 15 or other part of the framework or base. When carried by a frame standard it is necessary that the brush be insulated therefrom, and it is preferable to make the lever 23 out of insulation material.

The pivot point of the brush lever is not concentric with the shaft 16, and hence the brush moves through a larger arc than do the armature contact points 21. Thus a new rubbing surface of the brush is presented to the contact points for each adjustment of the brush, distributing the area of wear thereof.

The field magnet 11 has a winding 24 thereon, one terminal thereof being soldered or otherwise electrically connected to the magnet structure or frame, and the other terminal to one pole of a direct current source of electricity, preferably through switch means (not shown). The brush 22 is electrically connected to the opposite pole of the electric source, either by direct connection or through a common ground.

The field magnet 11 and the metallic frame 12 provide a current path to the armature shaft 16, which is supported within and in contact with respective legs 14 and 15, thence through the body of the armature to the respective rivets thereof.

Assuming the motor to be set up as in Fig. 1 and connected to the electric power source, the circuit will be completed through the brush 22 when any rivet head 21 contacts the same. The field coil 24 will be energized and will set up a momentary magnetic flux at the poles of the field magnet.

The maximum diameter of the armature is but slightly less than the spacing between the field poles, and the position of the armature relative thereto is such that in a four-pole armature as illustrated, the opposed poles thereof create a maximum flux path between the field poles every quarter revolution. If at the point of momentary contact of the brush and the armature the poles of the armature are angularly disposed with respect to the poles of the field magnet, there will be an immediate rotative force applied to the armature, since the latter will tend to move to present the best electromagnetic path therethrough. The armature is relatively heavy and hence has a substantial inertia. The brush is so adjusted that shortly after the armature begins to rotate, the brush disconnects from the rivet head or other contact point, breaking the field coil circuit and deenergizing the field magnet. However, the armature continues to rotate by virtue of the inertia thereof and after a quarter turn of rotation the field coil will again be energized and the armature will receive another motive pulse.

Speed of rotation of the motor can be regulated within certain limits by the location at which the brush engages a contact point. The closer the point of engagement is with respect to the alignment of the armature and field magnet poles, the lesser is the driving effect on the armature, and the slower the armature will rotate. When a brush position is reached wherein the brush engages the contact point when opposite poles of the armature are substantially in a direct line between the poles of the field magnet, there will be insufficient rotative torque applied to the armature and the motor will stop. Similarly, if the field magnet circuit is completed at a point where the armature presents an insufficient magnetic path, insufficient rotative force will be applied to the armature.

The direction of rotation of the armature depends on the position of the armature poles with respect to the field magnet poles, when the field coil energizing circuit is completed.

In the showing of Fig. 2, for example, the armature will tend to rotate counterclockwise of the figure because the magnetic path through the armature will exert a leftwardly rotating thrust on the armature. On the other hand, if the armature position was such that its right hand pole was above the adjoining field magnet pole upon completion of the field coil circuit, the resulting downward pull on the armature pole would result in a right hand or clockwise rotation.

It will be seen therefore that operation of the motor depends on the completion of a momentary circuit through the armature, which is in series electrical connection with a terminal of the field coil winding. The rivet or fastener heads 21 represent a convenient means of momentarily closing the circuit through the armature and the field coil. It is obvious that other means, such as a shoulder or lug struck outwardly from the outermost armature lamination will be the full mechanical equivalent of the respective contact heads 21. It is also apparent that a solid, rather than laminated armature can be used. It is believed that an armature formed of pressed and sintered iron powder should be completely satisfactory.

Although the invention has been described by making a fully detailed reference to a certain presently preferred embodiment, such detail of description is to be understood in an instructive rather than a limiting sense, many changes being possible within the scope of the claims hereto appended.

I claim:

1. An electric motor comprising a field magnet having an energizing coil and a pair of spaced field poles; a non-magnetic frame for supporting said field magnet; a laminated armature having four equidistantly-spaced poles mounted in said frame for rotation between said field poles, the latter being so positioned that for each quarter revolution of said armature the respectively opposite poles thereof provide a direct magnetic path between said field poles; fastening means extending through said armature laminations centrally of each pole thereof, each said fastening means having a contact head electrically connected to said armature and disposed about a circle concentric with the axis of rotation of said armature; a metallic brush disposed in the path of rotation of said contact points to be engaged successively thereby as the armature rotates; means for shifting said brush to one side or the other of the axis of rotation of said armature for contact with said contact points adjustably in advance of the rotative position of said armature in which the poles thereof present the maximum magnetic path between said field poles according to the desired direction of rotation of said armature; means for electrically connecting said armature in series with one terminal of said field coil winding; and means for electrically connecting the other terminal of said field coil winding and the brush respectively to opposite poles of a source of direct-current electricity.

2. An electric motor comprising a field magnet having a field coil and spaced field poles; a multipolar armature mounted for rotation between said poles, said armature and said field coil being in series circuit in one branch of a two pole electrical circuit, and each said armature pole having a contact point of relatively small area equidistantly spaced about the axis of rotation of said armature; a single metallic brush connected to the other branch of said electric circuit and arranged successively to engage said contact points upon rotation of said armature, to complete the field coil circuit; and means for adjusting the point of engagement of said brush with said contact points on either side of the axis of rotation of said armature to regulate the instant of circuit completion with respect to the position of said armature poles relative to the field poles.

IRVING D. WALLACH.

REFERENCES CITED

The following references are of record in the file of this patent:

UNITED STATES PATENTS

| Number | Name | Date |
|---|---|---|
| 1,223,375 | Elliott | Apr. 24, 1917 |
| 1,234,261 | Basinger | July 24, 1917 |
| 1,599,415 | Janette | Sept. 14, 1926 |
| 2,266,037 | Henninger et al. | Dec. 16, 1941 |